US006205756B1

(12) United States Patent
Orsborn et al.

(10) Patent No.: US 6,205,756 B1
(45) Date of Patent: Mar. 27, 2001

(54) COTTON HARVESTER COLLECTION DELIVERY SYSTEM

(75) Inventors: Jesse H. Orsborn, Port Byron; Kevin Scott Richman, Hampton; James Kelley Adamson, Moline, all of IL (US)

(73) Assignee: Case Corporation, Racine, WI (US)

(*) Notice: Subject to any disclaimer, the term of this patent is extended or adjusted under 35 U.S.C. 154(b) by 0 days.

(21) Appl. No.: 09/088,798

(22) Filed: Jun. 1, 1998

(51) Int. Cl.[7] .................................................. A01D 46/08
(52) U.S. Cl. ........................................ 56/30; 56/41
(58) Field of Search ................................ 56/13.2, 13.3, 56/16.6, 30, 31, 32, 40, 28, 41, 27.5, 50

(56) References Cited

U.S. PATENT DOCUMENTS

| 1,135,096 | 4/1915 | Beach . |
| 1,885,437 | 11/1932 | Harazin . |
| 2,355,880 | 8/1944 | Macha . |
| 2,491,777 | 12/1949 | Smith . |
| 3,378,309 | 4/1968 | Copley et al. . |
| 3,464,191 | 9/1969 | Copley et al. . |
| 3,515,437 | 6/1970 | Copley et al. . |
| 4,501,112 | 2/1985 | Thedford et al. . |

Primary Examiner—Robert E. Pezzuto
(74) Attorney, Agent, or Firm—Mayer, Brown & Platt

(57) ABSTRACT

A conveyor system for a cotton picking machine having a duct for the air transport of cotton from the picking heads and cotton transport apparatus for receiving air borne cotton and moving it to a common collection location for the transport to a storage bin.

9 Claims, 4 Drawing Sheets

COTTON HARVESTER COLLECTION DELIVERY SYSTEM

BACKGROUND OF THE INVENTION

The present invention relates to cotton harvesters and more particularly to an improved conveyor system for transporting loose cotton fiber from the doffer area of the harvester to a cotton collection basket. The improved system utilizes both pneumatic and mechanical means to transport the cotton and is constructed to permit the use of more picker units with less complicated structures than has heretofore been possible.

DISCLOSURE STATEMENT

Mechanized cotton harvesters have been used or proposed in the industry for at least the last 80 to 85 years. In mechanized cotton harvesters two principle elements have always been present, specifically, some means by which the cotton can be removed from the plants and secondly a means for transporting the picked cotton from the removal area to a place of storage, which is commonly a large collection basket. From the collection basket, the picked cotton is generally compacted into bales or the like and sent for subsequent processing for use in the textile industry. Initially the mechanical picking of the cotton was accomplished by elongate elements that extended outwardly from the base unit of the harvesting apparatus in a direction generally parallel to the rows of cotton being picked. An example of such an apparatus can be found in U.S. Pat. No. 2,355,880, issued Aug. 15, 1944 to Macha. In this apparatus cotton stripping elements extend forwardly from the harvester apparatus body to engage two rows of cotton with longitudinally extending rotating elements having fingers that remove the cotton from the plant. The cotton that was thus freed from the plant was then conveyed rearwardly by screw conveyors into a pair of transversely extending conveyors which in turn, moved the cotton toward a mechanical belt, located midway between the two transversely extending conveyors, to remove the material to a collection basket.

As the development of harvesters progressed in ensuing years, the cotton was picked principally by means of harvesting means that included a picker spindle and a doffer type construction which harvests lint cotton from the plant without removing the total cotton boll. In this construction the picker spindle and the associated doffer rotate about vertical axes, so that the relatively greater weight of the stripper elements which had in prior equipment extended longitudinally outwardly away from the main body of the harvester was eliminated. With a reduction in the amount of effective weight that had to be supported from the front of the harvesting apparatus, it became possible for the width of the picking apparatus to be increased and for the number of rows of cotton that could be picked to be increased commensurately. Whereas it had earlier been possible to pick only one or two rows it became possible to increase that number to four, for example.

With the advent of improved apparatus for freeing lint-type cotton from the plant, new delivery means which incorporated a variety of pneumatic means to carry the cotton from the doffer area rearwardly and upwardly into a collection basket were developed. Early attempts to create the necessary airstream involved the use of fans which subjected the cotton to injury from the fans because of its incidental contact with the fan blades. In later developments, the pneumatic delivery systems were improved by various types of construction in which a vacuum was created next to the doffer mechanism that connected to a pneumatic tube that conveyed the cotton to the cotton basket, without any necessity of the cotton passing through a fan. One such construction can be seen in U.S. Pat. No. 4,501,112, issued Feb. 26, 1985 to Thedford, et al., and assigned to International Harvester Company.

In the picker spindle and doffer type cotton picking harvester the cotton enters into the stripping/doffing area between plant lifters which direct the plants between a forward and a rear positioned spindle/doffer operating pair, so that the plants passing between adjacent plant lifters are subjected to stripping on both sides. Since cotton is being removed from two sides of the plant row, it is necessary that a vacuum delivery system be provided for each of the stripping/doffing (picker head) units. This means that for a harvesting apparatus capable of simultaneously picking four rows of cotton that there are eight picker heads and, concomitantly, eight vacuum delivery systems to remove the cotton from each of the eight picker head doffers. Thus, although in theory, additional rows of cotton could be picked merely by adding additional picking heads and vacuum delivery systems, it became apparent that the increased weight and complexity of delivering cotton by the vacuum removal means through individual vacuum tubes became both expensive initially and somewhat more problematical in effectiveness during operation.

Difficulties also arose in the use of purely pneumatic delivery systems with the advent of high yield cotton where larger quantities of cotton had to be delivered. The inability of the pneumatic delivery systems to process the greater cotton volumes caused the operator to operate the harvester at lower speeds across the fields and thereby reduced harvester efficiency. As higher cotton yields were being produced, the difficulties arising from attempting to convey cotton totally by pneumatic means where a multiplicity of picking heads were being utilized acted as a limitation on the size of equipment that could be used.

It is a principle object of the present invention to provide an improved conveyor system for use on cotton harvesters that will permit the use of apparatus capable of processing greater quantities of cotton than has previously been possible.

An additional object of this invention is to provide an improved conveyor system for use on a cotton harvester in which means is provided to collect the cotton emanating from all of the doffer mechanisms and removing it from a transport housing means through a single pneumatic duct that transports cotton into a collector basket.

A further object of this invention is to provide an improved conveyor system in which cotton from all of the picking heads is discharged into a transversely extending conveyor system that moves the cotton to a single point of discharge into a pneumatic conveyor, which carries the cotton to the collecting basket.

Still another object of this invention is to provide an improved cotton conveyor system which utilizes a transversely positioned spiral feed screw system for receiving cotton from all of the picking means and mechanically moving it to a single location for pneumatic removal to the cotton collecting bin.

Other objects and advantages of this invention will be in part obvious and in part explained by reference to the accompanying specification and drawings in which.

Figure 3:
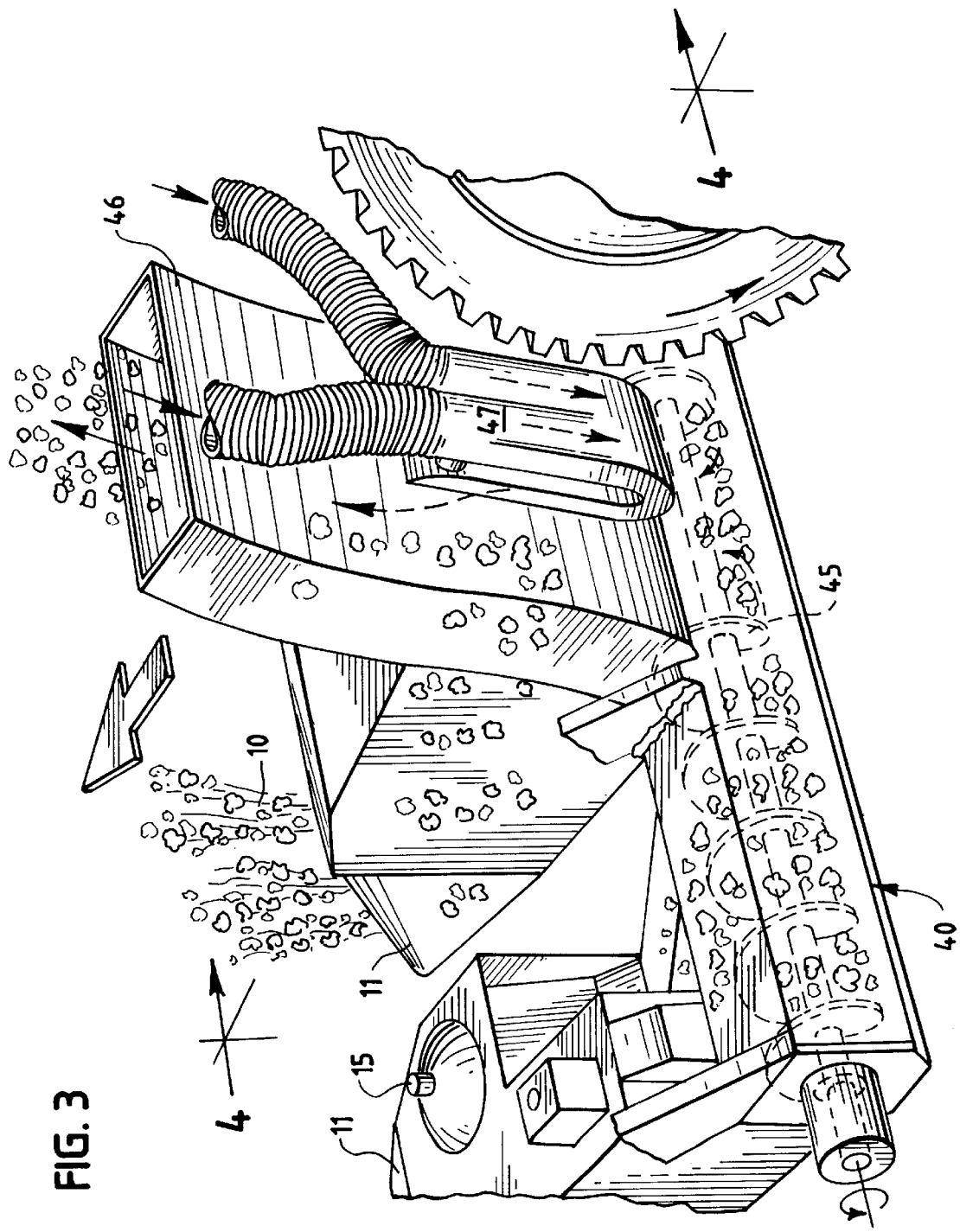
Figure 4:
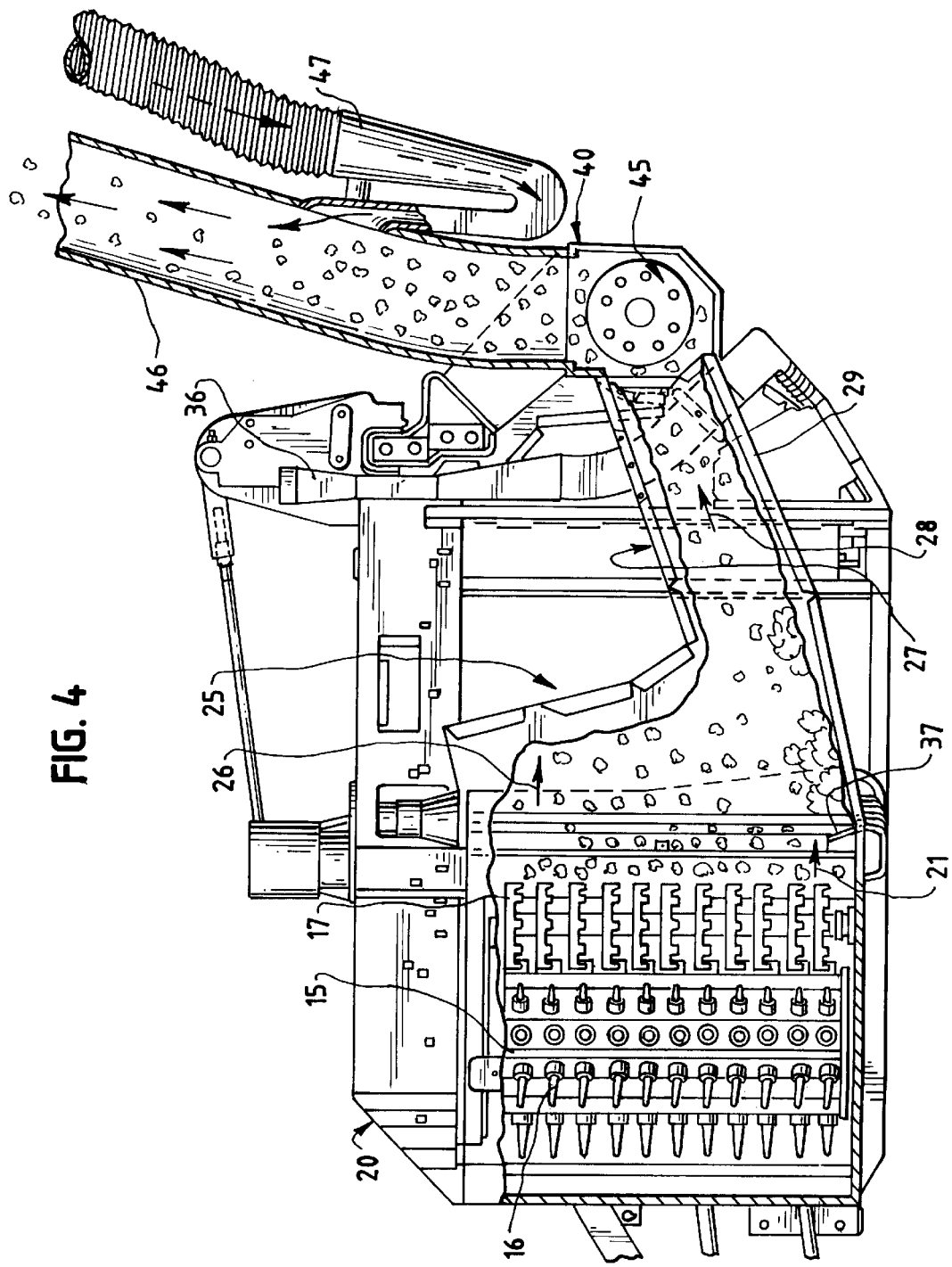

FIG. 3 is an elevation looking toward the picking heads and showing the manner in which a helical screw feed is used to transport cotton to a collection tube; and FIG. 4 is a side elevation, partially sectioned, showing the manner in which cotton fiber is directed from the picking means through cooperating duct means and into the transport housing where it is moved laterally of the picking heads to the point of transport to a region of removal.

DETAILED DESCRIPTION OF THE DRAWINGS

Figure 1:
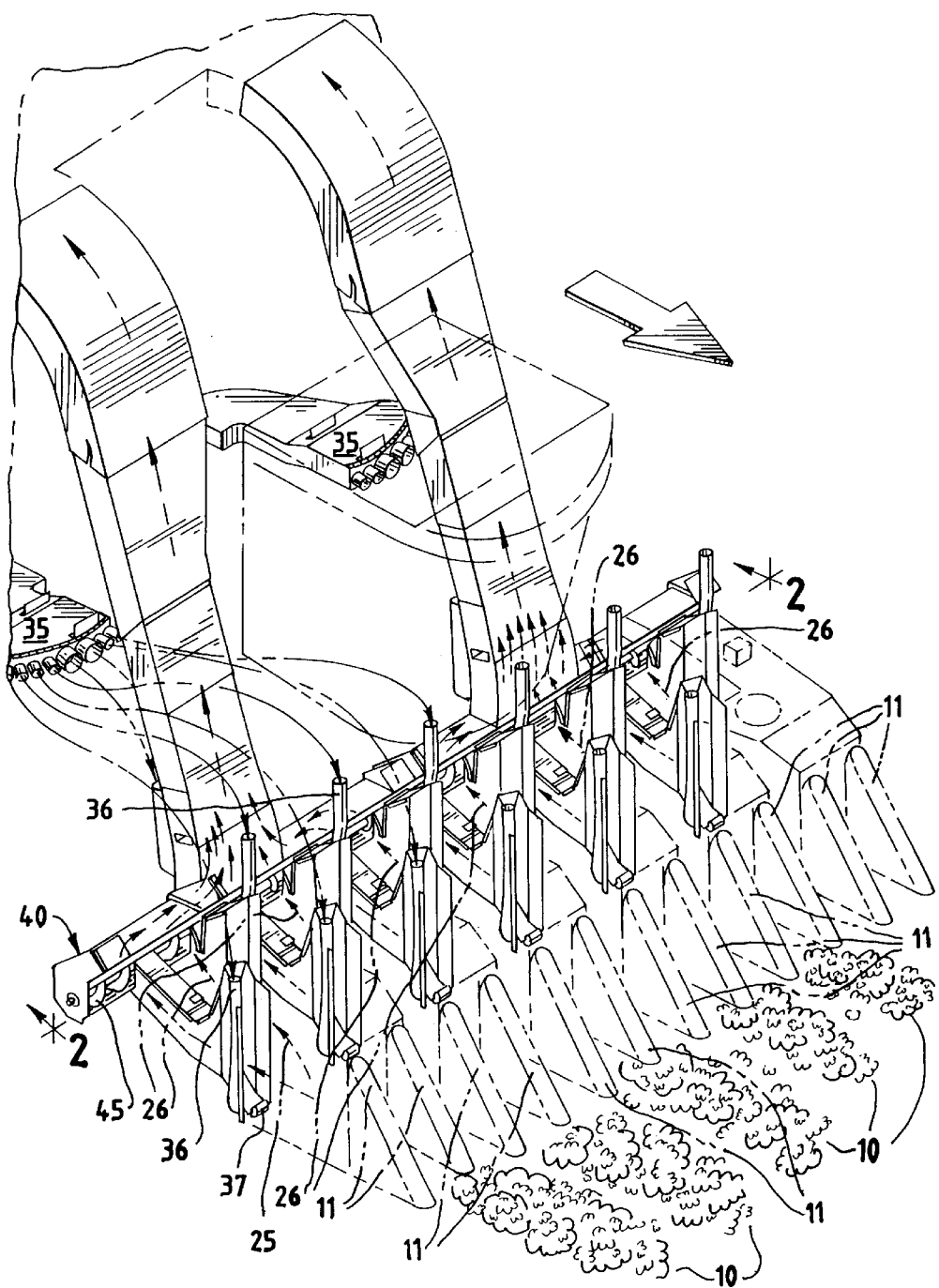
FIG. 1 is a partially diagrammatic perspective view showing the improved cotton transport means of this invention, as it is positioned between the harvester picking means and the cotton collection means.

As mentioned above, the present invention relates to an improved system for conveying cotton from a plurality of picking means to a point of collection for removal into a cotton basket. For a more detailed explanation of the present system, reference is made to FIG. 1 of the drawings, in which numeral 10 identifies a plurality of rows of cotton plants from which cotton is to be removed by the cotton harvesting apparatus. It will be noted that for purposes of illustration the harvester is shown as being capable of simultaneously stripping cotton from six rows. It is to be understood, however, that the number of rows actually picked can either be greater or lesser depending upon the demands of the user. Each row of cotton 10 is directed between cooperating pairs of cotton lifters 11 which act to position the cotton bolls in proper position for entry into the picker means. In the present harvesting apparatus the picking means used is of the picker spindle and doffer type in which lint-type cotton is removed from the plants by means of a picker drum that rotates about a vertical axis. Associated with the picker drum is a doffing apparatus that removes the cotton from the fingers of the picker drum and presents it to the system for transport to the cotton basket. In this type of apparatus, each row of cotton 10, after it passes through plant lifters 11, is subjected to front and rear positioned picker spindle/doffer combinations so that the plants are subjected to the stripping of cotton on opposite sides. The general manner in which cotton is fed into cooperating plant lifters and then stripped of cotton by stripper spindles and doffers can be seen by reference to U.S. Pat. No. 4,501,112, which was referred to earlier and is incorporated herein by reference.

The spindle/doffer picking means combination can be seen by reference to FIG. 4 of the drawings, where numeral 15 indicates a rotary drum 15 which has a plurality of picking fingers 16 around its outer surface. When the plants are brought into contact with fingers 16 by movement of the harvesting apparatus in a forward direction, the cotton is removed from the plants and carried to the doffer 17. The doffer cooperates with the rotary drum 15 and removes the cotton fibers from spindle fingers 16. It can be seen that the picking means, comprised of spindle 15 and doffer 17 are contained within a housing 20 that has an outlet opening 21 which opens outwardly of the rear of the picking head. Attached to the rear of picker means housing 20 is duct means 25 which defines an inlet opening 26 which is of substantially the same size as the outlet opening 21 of housing 20. The outlet opening 21 and the inlet opening 26 are made substantially the same size so that there will be no impairment of the flow of cotton from doffer 17 into the duct means 25. Duct means 25 also comprises an enclosed body portion 27 defining a passage 28 having a floor 29 that extends upwardly and rearwardly from inlet opening 26.

Referring again to FIG. 4, a source of positive air 35 is provided for connection to each of the duct means 25 to provide an inflow of air adjacent the lower end of floor 29 and at a location adjacent the inlet opening 26. The air is connected through appropriate duct work to tubes 36 that extend downward vertically adjacent duct means 25 and then feed into the inlet openings 26 through rearwardly directed orifices 37. Orifices 37 are located, as previously indicated, immediately adjacent the start of the upwardly and rearwardly inclined floor 29 so that cotton falling from doffer 17 will, after it is collected on floor 29, be impelled rearwardly by the force of the air introduced through orifices 37. Further, orifices 37 extend substantially completely across the entire width of floor 29 at inlet opening 26 so that all of the material accumulating on the floor will be subjected to the incoming air stream.

As cotton flows rearwardly through passage 28, it is directed into a cotton transport housing means 40 that extends in a direction transverse to the direction of travel of the cotton harvester and transverse the lengths of the rows of cotton 10. Each of the enclosed body portions 27 and passages 28 are connected into the cotton transport housing means 40 so that all of the cotton that is being removed from the plants during picking operations is accumulated into cotton transfer housing means 40, rather than being immediately directed through an individual pneumatic conveyor toward a cotton basket. Contained within cotton transport housing means 40 are cotton transport means 45 which is operably associated with the transport housing 40 means to move the cotton received therein from the various duct means 25, that is where the passages 28 defined by body portion 27 open into transport housing means 40, to a single location for transport to the collection basket. In the present construction the means for moving the cotton transversely to a single area for removal to the cotton cage is shown as a mechanical conveyor 45 which is journaled for rotation within the cotton transport housing means 40. Specifically there is shown a mechanical conveyor 45 that uses helical flanges 48, 49 to move the cotton toward a discharge point that is connected to a vacuum duct 46. Duct 46 removes the cotton conveyed to it by conveyor 45. The duct 46 can be supplied with an effective vacuum by means of the introduction of air through air input connection 47 in a manner well-known in the art and as described in U.S. Pat. No. 4,501,112.

Figure 2:
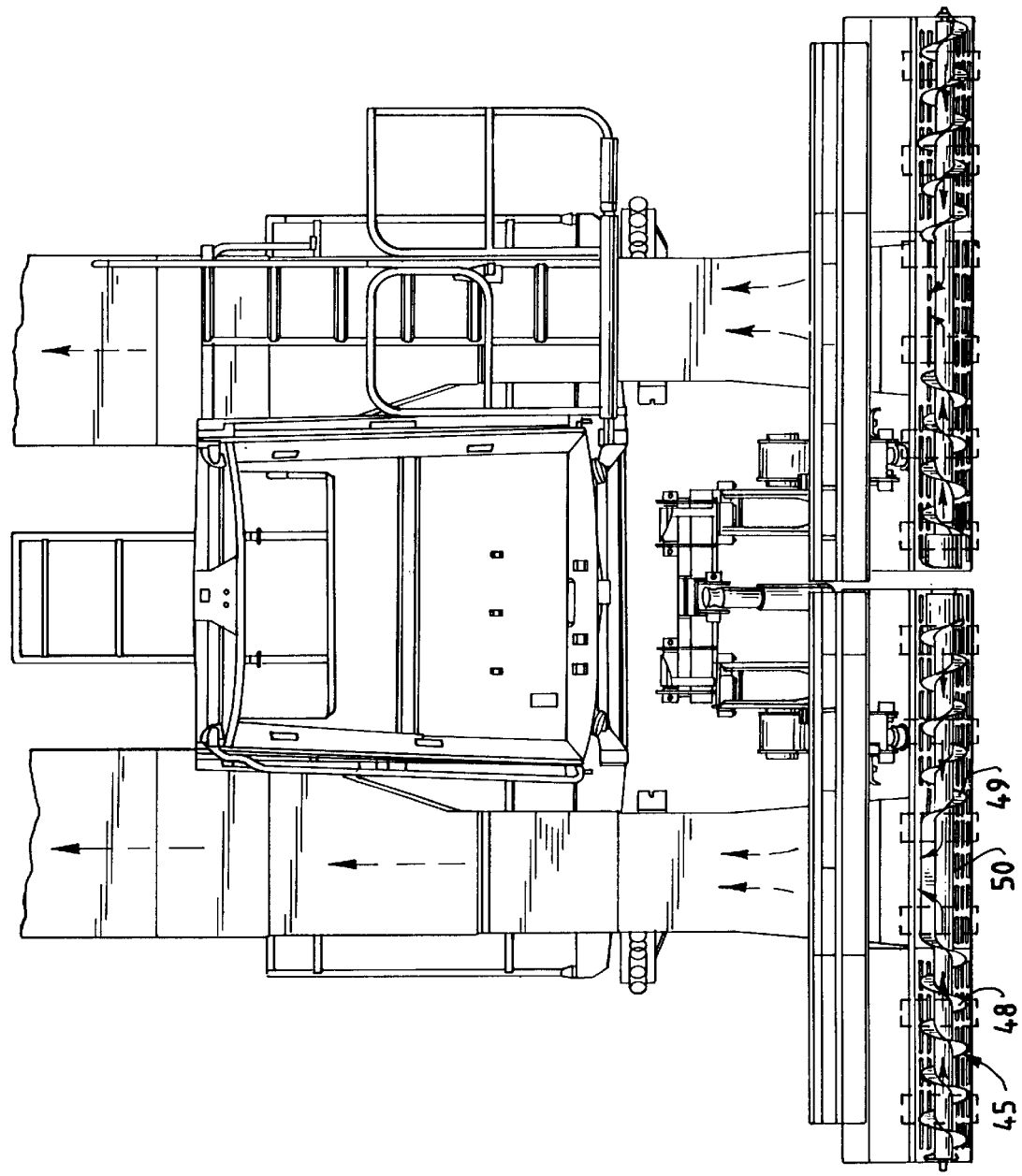
FIG. 2 is a front elevation taken along the line 2—2 of FIG. 1.

Referring to FIG. 2 of the drawing, it can be seen that the mechanical conveyor 45 has two sets of helical flanges 48 and 49. Helical flanges 48 and 49 are of opposite advance so that upon rotation of the shaft 50 cotton that enters into transport housing means 40 from passages 28 will be moved from the direction of the ends of means of 40 toward the center thereof. At this point the vacuum within vacuum duct 46 acts to remove all of the cotton and direct it upwardly and rearwardly for collection in a cotton basket.

It is hereby claimed:

1. In combination with a cotton harvesting machine having a common vacuum duct and a plurality of transversely disposed cotton picking means including picker spindles and doffers which are rotatable about vertical axes and are enclosed by a housing with an outlet opening for discharging the picked cotton, a conveyor system for receiving cotton from the picking means, the conveyor system comprising:

(a) duct means connected to each picking means having
  (i) an inlet opening of approximately the same size as the picking means housing outlet opening and in communication therewith and (ii) an enclosed body portion defining a passage having a floor that extends upwardly and rearwardly from the inlet opening;

(b) cotton transport housing means connected to a plurality of the duct means to receive cotton from a plurality of picking means;

(c) means for introducing a positive pressure stream of air into the duct means along the floor thereof and adjacent the inlet opening to move cotton through the duct passage into the cotton transport housing; and (d) cotton transport means operably associated with the transport housing means to move the cotton received therein from the duct means toward the common vacuum duct.

2. A conveyor system as defined in claim 1 wherein the cotton transport means comprises a mechanical conveyor.

3. A conveyor system as defined in claim 2 wherein the mechanical conveyor is journaled for rotation within the cotton transport housing means and has flanges that move the cotton toward the discharge port.

4. A conveyor system as defined in claim 1 wherein the discharge port is located at the midsection of the transport housing means.

5. A conveyor system as defined in claim 1 which includes means creating a negative air pressure at the discharge port to remove cotton delivered thereto by the cotton transport means.

6. A conveyor system as defined in claim 1 wherein the means for introducing a positive airstream includes means for directing the air across substantially the entire width of the duct floor in the direction toward the cotton transport housing means.

7. A conveyor system as defined in claim 1 wherein means is provided to transport cotton from the discharge port to a cotton collection basket.

8. A conveyor system as defined in claim 3 wherein the flanges are helical.

9. A conveyor system as defined in claim 8 wherein there are two sets of helical flanges, which flanges are of opposite advance to move cotton toward the midsection of the transport housing means.

* * * * *